(12) United States Patent
Vishik et al.

(10) Patent No.: US 8,095,605 B2
(45) Date of Patent: *Jan. 10, 2012

(54) METHOD AND SYSTEM FOR INTELLIGENT ROUTING BASED ON PRESENCE DETECTION

(75) Inventors: Claire Svetlana Vishik, Austin, TX (US); Sreenivasa Rao Gorti, Austin, TX (US); Paul Van Vleck, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/172,710

(22) Filed: Jul. 14, 2008

(65) Prior Publication Data

US 2009/0019542 A1    Jan. 15, 2009

Related U.S. Application Data

(63) Continuation of application No. 09/990,761, filed on Nov. 16, 2001, now Pat. No. 7,415,502.

(51) Int. Cl.
  *G06F 15/16*   (2006.01)
  *G06F 15/173*  (2006.01)
  *H04N 7/16*    (2006.01)
  *H04M 3/42*    (2006.01)

(52) U.S. Cl. ........ 709/206; 709/204; 709/223; 709/224; 709/239; 709/245

(58) Field of Classification Search .............. 709/223, 709/224, 206, 239, 245, 204; 725/10; 379/201.03, 379/211.02
See application file for complete search history.

(56) References Cited

U.S. PATENT DOCUMENTS

| | | | |
|---|---|---|---|
| 4,757,525 A | 7/1988 | Matthews et al. | |
| 5,493,692 A | 2/1996 | Theimer et al. | |
| 5,515,426 A | 5/1996 | Yacenda et al. | |
| 5,550,907 A | 8/1996 | Carlsen | |
| 5,652,789 A | 7/1997 | Miner et al. | |
| 5,742,905 A | 4/1998 | Pepe et al. | |
| 5,930,804 A | 7/1999 | Yu et al. | |
| 5,943,478 A | 8/1999 | Aggarwal et al. | |
| 5,946,386 A | 8/1999 | Rogers et al. | |
| 5,956,485 A | 9/1999 | Perlman | |
| 6,205,139 B1 | 3/2001 | Voit | |
| 6,219,793 B1 | 4/2001 | Li et al. | |
| 6,246,751 B1 | 6/2001 | Bergl et al. | |
| 6,260,148 B1 | 7/2001 | Aggarwal et al. | |
| 6,263,064 B1 * | 7/2001 | O'Neal et al. | 379/201.03 |
| 6,343,115 B1 | 1/2002 | Foladare et al. | |
| 6,480,580 B1 | 11/2002 | Beswick et al. | |
| 6,564,261 B1 * | 5/2003 | Gudjonsson et al. | 709/227 |
| 6,735,287 B2 | 5/2004 | Vishik et al. | |
| 6,937,713 B1 * | 8/2005 | Kung et al. | 379/211.02 |

(Continued)

*Primary Examiner* — Asad M Nawaz
*Assistant Examiner* — Vitali Korobov
(74) *Attorney, Agent, or Firm* — Ed Guntin; Guntin Meles & Gust, PLC

(57) ABSTRACT

A message, which is to be routed to one of a plurality of authorized parties comprising a first authorized party and a second authorized party, is received by a routing system. A Web service is polled to detect for a presence of the first authorized party. After determining that the presence of the first authorized party remains undetected over an allocated time interval, the Web service is polled to detect for a presence of the second authorized party. In response to detecting the presence of the second authorized party, the message is routed to an active communication device associated with the second authorized party.

12 Claims, 2 Drawing Sheets

U.S. PATENT DOCUMENTS

| | | | |
|---|---|---|---|
| 6,983,370 B2 * | 1/2006 | Eaton et al. | 713/182 |
| 7,165,107 B2 * | 1/2007 | Pouyoul et al. | 709/225 |
| 7,197,565 B2 * | 3/2007 | Abdelaziz et al. | 709/226 |
| 7,415,502 B2 * | 8/2008 | Vishik et al. | 709/206 |
| 2001/0003202 A1 | 6/2001 | Mache et al. | |
| 2001/0025280 A1 | 9/2001 | Mandato et al. | |
| 2002/0026513 A1 | 2/2002 | Hoglund et al. | |
| 2002/0035605 A1 * | 3/2002 | McDowell et al. | 709/206 |
| 2002/0087704 A1 * | 7/2002 | Chesnais et al. | 709/228 |
| 2002/0184310 A1 * | 12/2002 | Traversat et al. | 709/204 |

* cited by examiner

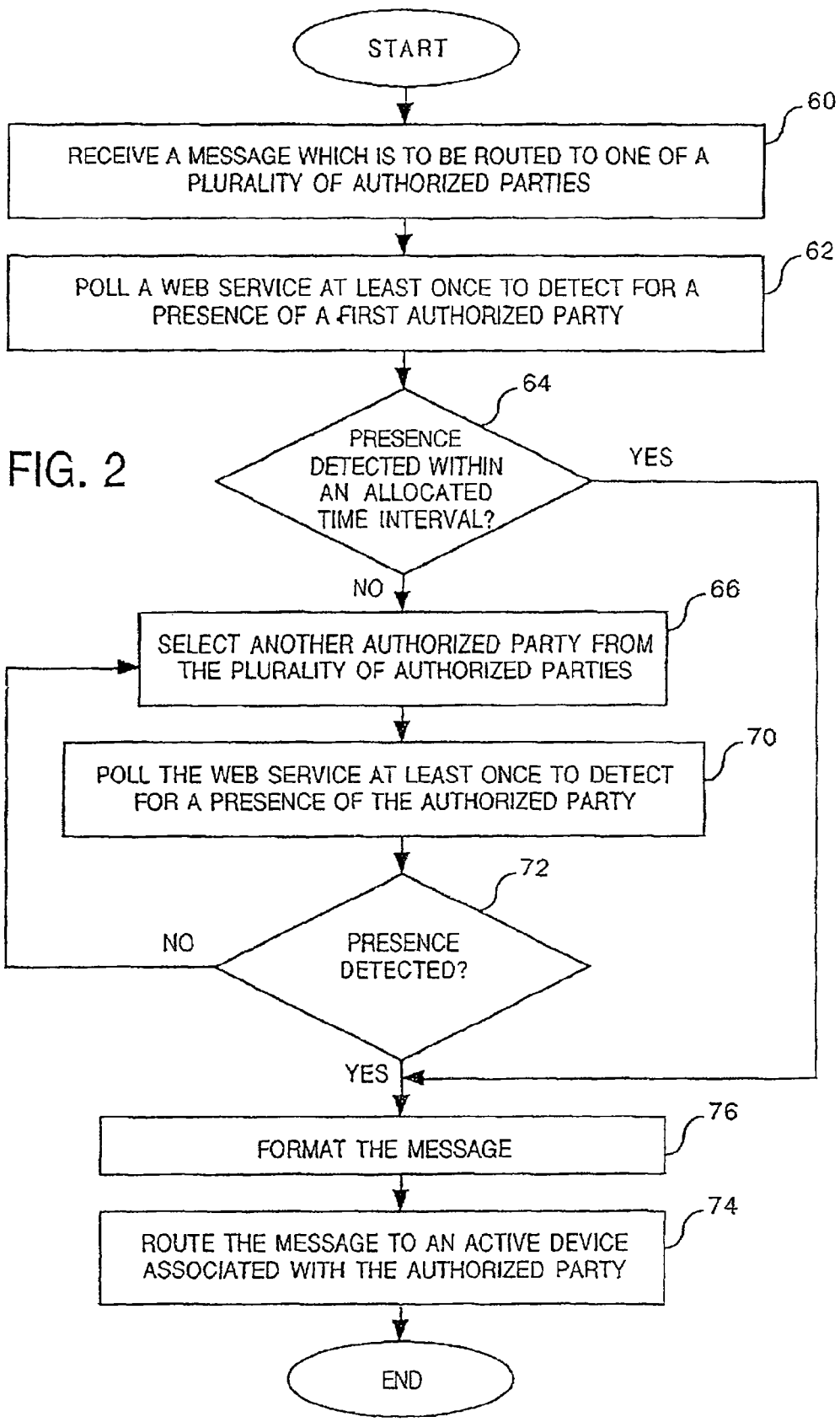

METHOD AND SYSTEM FOR INTELLIGENT ROUTING BASED ON PRESENCE DETECTION

RELATED APPLICATIONS

The present application is a continuation of U.S. patent application Ser. No. 09/990,761, filed Nov. 16, 2001 now U.S. Pat. No. 7,415,502, the entirety of which is hereby incorporated by reference.

The present application relates to U.S. patent application Ser. No. 11/418,281 (still pending), filed May 4, 2006, which is a continuation of Ser. No. 10/806,935 (now U.S. Pat. No. 7,065,184), filed Mar. 23, 2004, which is a continuation of U.S. patent application Ser. No. 09/990,760 (U.S. Pat. No. 6,735,287), filed Nov. 16, 2001, the entirety of each of which is hereby incorporated by reference.

TECHNICAL FIELD

The present invention relates to methods and systems for routing messages.

BACKGROUND

Presence management refers to the task of identifying whether a given user is available to receive a communication. The concept originated, at least in part, in instant messaging products such as those provided by AOL, Yahoo and MSN. In a typical scenario, a user's availability or presence is registered into an application-specific database in response to the user logging in to a particular software application. When other users wish to contact the user, the availability is obtained from the database using an application-specific protocol. In these scenarios, presence management is tied to particular software applications (e.g. AOL, Yahoo, MSN, and instant messaging products). The applications establish presence, with some user control, when the user logs in to an application. This method limits the information to the particular applications, and is not usable from outside the application for which it was designed.

It is believed that just-in-time applications will become a more important component for increasing the efficiency of business operations. In some systems, workflow and process management components exist that define rules for routing messages. Sometimes, messages can be translated and sent to various devices. In many such systems, rules are defined to route a request to an alternative responsibility holder or approver if the request has not been answered for a predefined amount of time or if the rules were changed while the approver is absent. Because the business systems do not detect presence of the users and approvers, alternative routing is not defined in advance.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 2 is a flow chart of an embodiment of a method performed by the routing system.

DETAILED DESCRIPTION OF THE DRAWINGS

Figure 1:
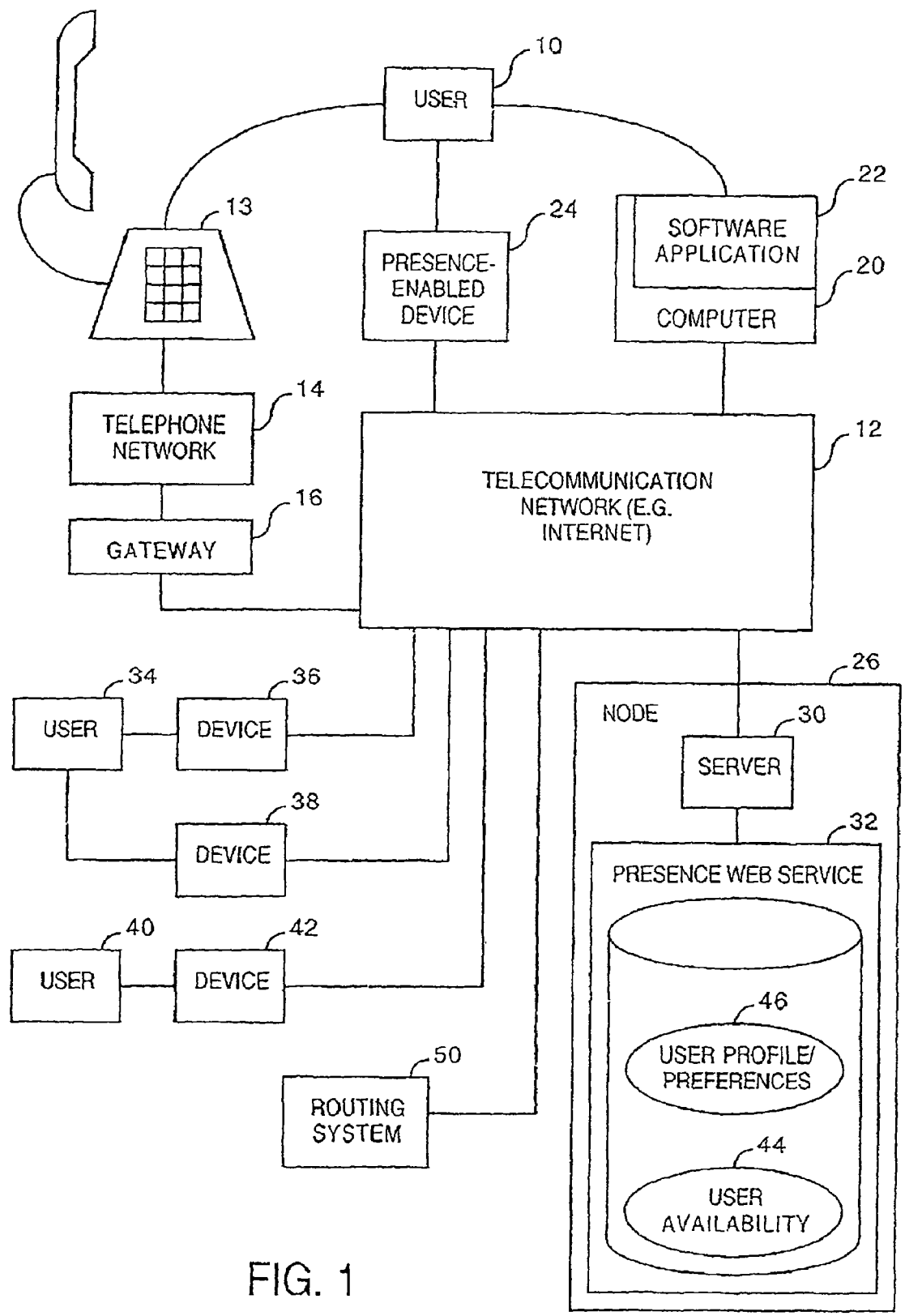
FIG. 1 is a schematic block diagram of an embodiment of a system to provide intelligent routing based on presence information.

Briefly, embodiments of the present invention provide an improved routing solution that uses a presence management and detection Web service in combination with communication tools having embedded presence management devices. This approach facilitates real-time detection of available approvers and their active devices, and dynamic selection of a desirable route to process the requests. The desirable route may comprise either a near-optimal route, or in an exemplary embodiment, an optimal route to process the request faster and more efficiently. The herein-disclosed routing solution is well-suited for business applications.

FIG. 1 is a schematic block diagram of an embodiment of a system to provide intelligent routing based on presence information. Consider a user 10 who accesses a telecommunication network 12 such as the Internet or another computer network. The user 10 may access the telecommunication network 12 using either a telephone 13 via a telephone network 14 and a gateway 16, a computing device such as a computer 20 running a software application 22, or a presence-enabled device 24. For any of the aforementioned ways that the user 10 accesses the telecommunication network 12, information indicating the presence of the user is compiled and made available by a node 26 of the telecommunication network 12. The node 26 may comprise a computer server 30 which provides a Web service 32 defined as a distributed service accessible over the telecommunication network 12 (e.g. the Internet) using ubiquitous protocols such as Simple Object Access Protocol (SOAP) and Extensible Markup Language (XML) over Hypertext Transfer Protocol (HTTP). The computer server 30 may comprise a JAVA™ 2 Platform Enterprise Edition (J2EE)/.NET application server, for example.

This disclosure contemplates a multiplicity of users of the telecommunication network 12 whose presence information is compiled and made available using the Web service 32. For example, the Web service 32 may provide presence information for a user 34 having two associated devices 36 and 38, and a user 40 having an associated device 42. Examples of the devices 36, 38 and 42 include, but are not limited to, those described in association with the user 10.

The Web service 32 decouples presence information from a particular application, and makes the presence information available as a network function. Separating presence management as a component service available from the telecommunication network 12 facilitates flexibility both for users to publish their presence information and for consuming applications to consume the presence information. As a result, cross-application services are enabled. For example, indicating unavailability on a personal computer internet messaging (PC-IM) client can be interpreted as a user directive to the telecommunication network 12 to hold off cellular telephone calls and/or to take messages.

The Web service 32 can be used in multiple applications, including but not limited to instant messaging, video conferencing, chat, business-to-business applications such as document routing for approval, and routing notifications to an appropriate device. The presence information may be published in multiple modes, including but not limited to a Web browser, a Voice XML application, a mobile telephone, and a specialized presence device. The presence information may be either explicitly updated by the user or implicitly handled by various devices and/or software applications.

The presence information can be consumed by multiple devices, including but not limited to a Web browser, a mobile telephone, a personal computer, a personal digital assistant and a Web tablet. Independent of the actual presence information, the service may provide other information such as updatable and consumable user availability information 44, user/device profile and preference information 46, device status information and user location information.

A routing system 50 intelligently routes messages and documents based on presence information provided by the Web service 32. An embodiment of a method performed by the routing system 50 is described with reference to FIG. 2.

As indicated by block 60, the method comprises receiving a message which is to be routed to one of a plurality of authorized parties. The message may be received via the telecommunication network 12 or another network. Although the authorized parties may comprise any number of users, for purposes of illustration and example consider the authorized parties comprising a first authorized party, a second authorized party and a third authorized party. Further consider that the first authorized party is the user 34, the second authorized party is the user 10 and the third authorized party is the user 40.

The message may comprise a request which is to approved. In this case, the first authorized party is a main approver of the request, and the second authorized party is a secondary approver of the request. In general, the authorized parties may comprise one or more secondary approvers. The secondary approvers may be ranked to provide an order for attempting to detect their presence. For purposes of illustration and example, consider the second authorized party being ranked ahead of the third authorized party.

As indicated by block 62, the method comprises polling the Web service 32 at least once to detect for a presence of the first authorized party. If the presence of the first authorized party is not immediately detected by the Web service 32, the Web service 32 may be repeatedly contacted either at periodic or aperiodic intervals to detect for the presence of the first authorized party.

As indicated by block 64, the method comprises determining if the presence of the first authorized party is determined within an allocated time interval. If it is determined that the presence of the first authorized party remains undetected over the allocated time interval, an act of selecting another authorized party from the plurality of authorized parties is performed as indicated by block 66. Preferably, the selection is made automatically based on the highest ranked party whose status has yet to be determined by polling the Web service 32. Returning to the above example, this act would comprise selecting the second authorized party at this time.

As indicated by block 70, an act of polling the Web service at least once is performed to detect for a presence of the selected authorized party. As indicated by block 72, the method comprises determining if the presence of the selected authorized party is detected. If the presence is undetected, flow of the method is directed back to block 66 to select another authorized party from the list, and poll the Web service 32 to detect for its presence.

In response to detecting the presence of an authorized party, either in block 64 or block 72, an act of routing the message to an active communication device associated with the authorized party is performed as indicated by block 74. Optionally, as indicated by block 76, the method may further comprise formatting the presentation of the message for the active communication device prior to routing the message. The message may be coded in a markup language, such as XML for example.

Beneficially, the presence of each authorized party is detectable by the Web service for a plurality of different communication devices associated therewith. Further, the presence of the each authorized party is detectable independent of whether the authorized party logs in to a particular software application (e.g. an instant messaging application). Still further, the Web service preferably provides presence information for a plurality of different software applications, one of which being the herein-disclosed routing application.

A more specific example is given to further motivate use of embodiments of the herein-disclosed routing method and system. Consider an operator submitting a purchase order to the routing system 50. The order needs to be approved by her department manager (user 34), who is the main approver. The order is urgent: it must be approved within two hours.

The routing system 50 contacts the Web service 32 to inquire about the presence of the main approver. The main approver is unavailable and all his devices 36 and 38 are inactive. The routing system 50 continues to poll the Web service 32 every 15 minutes. With the main approver's presence remaining undetected after one and a half hours, a ranked list of alternative approvers is activated. The routing system 50 sends a request to the Web service 32 to determine the presence of the top alternative approver (user 10). The devices of the top alternative approver are polled, and it is determined that his personal digital assistant (PDA) is active. The PDA is determined to be allowable to receive alerts from the routing system 50. The routing system 50 formats the approval request for the PDA, and sends the request to the PDA. The user 10 may then approve the purchase order using the PDA.

Several embodiments including preferred embodiments of a method and system for intelligent routing based on presence detection are disclosed herein.

The proposed presence-based routing solution may be a component of various business applications, from supply chain management to procurement and billing. After receiving a request that needs to be routed to a process owner, the routing system contacts a Web service to detect presence and active devices for those authorized to approve a request. If the routing system is set up to operate in an automated mode, the availability of the main approver and his/her active device is checked. If available, the request is routed to the main approver's active device. If the presence of the main approver is not detected and the time allocated for his/her approval expires, the presence Web service is polled to detect presence and active devices of the secondary or alternative approvers. Consequently, the routing system routes requests according to the rules set up in the presence-based routing applications.

The herein-disclosed method and system allows organizations to speed up business processes involving mobile and distributed work force. Additionally, the presence-based routing system can be built to be application-independent to work with various business systems, in contrast to current routing systems which are applications-driven.

The routing system 50 may comprise a computer system to perform the acts described herein. The computer system may be directed by computer-readable program code stored by a computer-readable medium. Similarly, the acts performed by the node 26 may be directed by computer-readable program code stored by a computer-readable medium.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

The invention claimed is:

1. A method for routing a message to one of a plurality of authorized parties, the method comprising:
   receiving a message which is to be routed to one of a plurality of authorized parties, the plurality of authorized parties comprising a first authorized party who is a user of a first plurality of communication devices and a second authorized party who is a user of a second plurality of communication devices;
   determining that none of the communication devices in the first plurality of communication devices is active by polling a Web service to detect a presence of the first authorized party;
   determining that one of the communication devices in the second plurality of communication devices is active by polling the Web service to detect a presence of the second authorized party; and
   routing the message to the active communication device in the second plurality of communication devices.

2. The method of claim 1, wherein the message comprises a request, the first authorized party is a main approver of the request, and the second authorized party is a secondary approver of the request.

3. The method of claim 1, wherein the determination that none of the communication devices in the first plurality of communication devices is active is made independent of whether the first authorized party is logged into a particular device or software application.

4. The method of claim 1, wherein the message is an instant message.

5. The method of claim 1, further comprising:
   formatting the message for presentation on the active communication device in the second plurality of communication devices.

6. A non-transitory computer-readable storage medium for storing a set of instructions for routing a message to one of a plurality of authorized parties, the set of instructions comprising:
   receiving a message which is to be routed to one of a plurality of authorized parties, the plurality of authorized parties comprising a first authorized party who is a user of a first plurality of communication devices and a second authorized party who is a user of a second plurality of communication devices;
   determining that none of the communication devices in the first plurality of communication devices is active by polling a Web service to detect a presence of the first authorized party;
   determining a that one of the communication devices in the second plurality of communication devices is active by polling the Web service to detect a presence of the second authorized party; and
   routing the message to the active communication device in the second plurality of communication devices.

7. The non-transitory computer-readable storage medium of claim 6, wherein the message comprises a request, the first authorized party is a main approver of the request, and the second authorized party is a secondary approver of the request.

8. The non-transitory computer-readable storage medium of claim 6, wherein the determination that none of the communication devices in the first plurality of communication devices is active is made independent of whether the first authorized party is logged into a particular device or software application.

9. A system for routing a message to one of a plurality of authorized parties, the system comprising:
   a computer system operative to:
      receive a message which is to be routed to one of a plurality of authorized parties, the plurality of authorized parties comprising a first authorized party who is a user of a first plurality of communication devices and a second authorized party who is a user of a second plurality of communication devices;
      determine that none of the communication devices in the first plurality of communication devices is active by polling a Web service to detect a presence of the first authorized party;
      determine that one of the communication devices in the second plurality of communication devices is active by polling the Web service to detect a presence of the second authorized party; and
      route the message to the active communication device in the second plurality of communication devices.

10. The system of claim 9, wherein to determine that none of the communication devices in the first plurality of communication devices is active, the computer system is operative to poll a Web service to detect a presence of the first authorized party.

11. The system of claim 9, wherein the message comprises a request, the first authorized party is a main approver of the request, and the second authorized party is a secondary approver of the request.

12. The system of claim 9, wherein the computer system is operative to determine that none of the communication devices in the first plurality of communication devices is active independent of whether the first authorized party is logged into a particular device or software application.

* * * * *